United States Patent

[11] 3,609,163

[72] Inventors Emmett H. Burk, Jr.
Glenwood, Ill.;
Donald D. Carlos, Crown Point, Ind.
[21] Appl. No. 798,186
[22] Filed Feb. 10, 1969
[45] Patented Sept. 28, 1971
[73] Assignee Atlantic Richfield Company
Continuation-in-part of application Ser. No.
681,925, Nov. 9, 1967, now Patent No.
3,480,595, Continuation-in-part of
application Ser. No. 592,285, Nov. 7, 1966,
now abandoned.

[54] PROCESS FOR PREPARING 5- VINYL-1,3,4-DIOXCAZOL-2-ONES
15 Claims, No Drawings
[52] U.S. Cl. .................................................. 260/307,
260/343.9, 260/501.5
[51] Int. Cl. ..................................................... C07d 85/00
[50] Field of Search ......................................... 260/307.1

[56] References Cited
OTHER REFERENCES

Beck, Berichte, 84, 1951, pp. 688–9.
Wagner et al., Synthetic Organic Chemistry, John Wiley, New York, 1953, pp. 483–4.

*Primary Examiner*—Alex Mazel
*Assistant Examiner*—R. J. Gallagher
*Attorney*—Morton, Bernard, Brown, Roberts & Sutherland ABSTRACT: A multistep process for preparing ethylenically unsaturated cyclic nitrile carbonate compounds such as ethene nitrile carbonate,

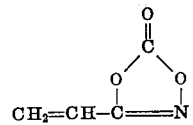

is disclosed. A lactone is first reacted with hydroxylamine to obtain a hydroxyl group-containing monohydroxamic acid:

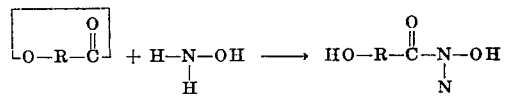

The hydroxamic acid is then phosgenated to obtain a cyclic nitrile carbonate group-containing chloroformate:

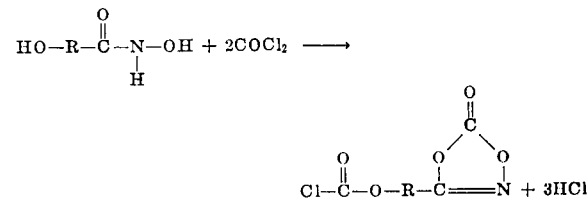

The chloroformate is then contacted with an organic, tertiary amine having a pK value below about 5 to effect decarboxylation and dehydrochlorination of the chloroformate and production of an ethylenically unsaturated cyclic nitrile carbonate compound such as ethene nitrile carbonate, shown above.

PROCESS FOR PREPARING 5- VINYL-1,3,4-DIOXCAZOL-2-ONES

This application is a continuation-in-part of copending application Ser. No. 681,925, filed Nov. 9, 1967, (now U.S. Pat. No. 3,480,595) which latter application is, in turn, a continuation-in-part of application Ser. No. 592,285, filed Nov. 7, 1966. 1966.

The present invention relates to certain chemical compounds and their synthesis. MOre particularly it is concerned with (a) the preparation of a certain class of hydroxyl-containing, aliphatic monohydroxamic acids, (b) the reaction of the foregoing acids with phosgene to produce cyclic nitrile carbonate group-containing chloroformates, and (c) the conversion of certain of the foregoing chloroformates to ethylenically unsaturated cyclic nitrile carbonates.

In U.S. Pat. applications Ser. No. 681,925 of Burk and Carlos, filed Nov. 9, 1967 and Ser. No. 592,285, also of Burk and Carlos, field Nov. 7, 1966 are disclosed, inter alia, ethylenically unsaturated cyclic nitrile carbonate compounds of the general formula:

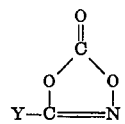

wherein y is an addition polymerizable, ethylenically unsaturated group, for example vinyl, as well as addition polymers thereof. These cyclic nitrile carbonate group-containing monomers and polymers are condensable with reactive hydrogen-containing compounds such as alcohols, amines, and thiols to yield condensation products such as urethanes, ureas, and thiourethanes. Thus, the ethylenically unsaturated cyclic nitrile carbonate compounds can enter into addition polymerization reactions (either homopolymerization or copolymerization) as well as condensation reactions with labile hydrogen-containing compounds to yield a variety of polymeric materials, such as polyurethanes, which can be employed in, for instance, coating and molding compositions.

By the present invention there is provided a process for preparing a certain class of such ethylenically unsaturated cyclic nitrile carbonate compounds, which process involves the dehydrochlorination and decarboxylation of certain cyclic nitrile carbonate group-containing chloroformates. There is further provided by the present invention a process for preparing cyclic nitrile carbonate group-containing chloroformates which can be used as blowing agents for vinyl resins and the like, and some of which are useful as intermediates for the preparation of ethylenically unsaturated cyclic nitrile carbonates. The process involves phosgenation (i.e., reacting with phosgene) of a certain class of hydroxyl-containing, aliphatic monohydroxamic acids. Finally, there is provided by the present invention a process for preparing the hydroxyl-containing, aliphatic monohydroxamic acids which can be used as intermediates for the preparation of the above-mentioned cyclic nitrile carbonate group-containing chloroformates.

The above reactions will be discussed in their order of synthesis. The first reaction is that resulting in the production of a hydroxyl-containing, aliphatic monohydroxamic acid. According to the present invention such acids are prepared by reacting hydroxylamine with a lactone which has at least four members in its ring and which is a cyclic anhydride of a monohydroxyl-substituted aliphatic hydrocarbon monocarboxylic acid of 3 to 12, preferably 3 to 6, carbon atoms.

Branched chain as well as unbranded lactones can be employed. Thus, the lactone can be a cyclic anhydride of a straight chain or of a branded chain acid, the hydroxyl substituent of which acid can be either a primary, secondary or tertiary hydroxyl group. Preferably, however, a lactone will be unbranched—that is, it will be a cyclic anhydride of an omega hydroxyl group-containing, straight chain, aliphatic hydrocarbon monocarboxylic acid. It is also preferred that the lactone be saturated—that is, that it be a cyclic anhydride of a monohydroxyl-substituted alkane monocarboxylic acid. Suitable lactones for use in preparing the hydroxyl-containing monohydroxamic acids of the invention include, for example, 3-hydroxypropanoic acid lactone, 6-hydroxydexanoic acid lactone, and 12-hydroxydodecanoic acid lactone.

The hydroxyl-containing monohydroxamic acid obtained from the reaction of the lactone with hydroxylamine is the hydroxamic acid counterpart—i.e., the N-hydroxyamide—of the aliphatic hydroxyacid from which the lactone is derived. Thus, where the lactone employed is, for example, 3-hydroxypropanoic acid lactone the reaction with hydroxylamine proceeds to yield 2-hydroxyethane-1hydroxamic acid:

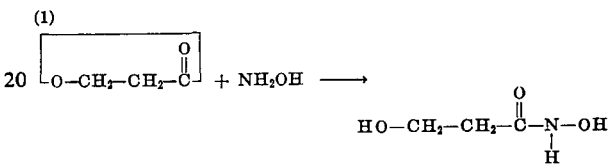

Because the lactone starting material has at least four members in its ring, the N-hydroxyamide (i.e., the monohydroxamic acid) obtained therefrom will be characterized by its carbon-bonded hydroxyl group being separated from its carbonyl carbon atom but at least 2 carbon atoms. In other words, the carbon-bonded hydroxyl group of the hydroxamic acid will be attached to a carbon atom which is separated from the carbonyl group by at least one intervening carbon atom, as is the case with 2-hydroxyethane-1-hydroxamic acid, shown above.

The reaction of the lactone with the hydroxylamine can be effected by contacting the reactants with one another in the presence of a suitable stable solvent for the hydroxylamine, such as tetrahydrofuran, methanol, water, and the like, at temperatures below the decomposition temperature of hydroxylamine, such as about −10° to +70° C., preferably about −5° to +30° C. By "stable," in referring to the solvent, is meant a solvent which is nonreactive with the reactants or the product under the conditions prevailing in the reaction zone. The amount of hydroxylamine employed is preferably at least equimolar to the amount of lactone. Often from 1 to about 3 moles of hydroxylamine will be employed per mole of lactone; while a higher ratio of hydroxylamine to lactone could be employed, no advantage seems to reside in the use of such an excess.

Where the solvent employed for the foregoing reaction is an organic solvent in which the hydroxyl-containing monohydroxamic acid product is likewise soluble, the product can be recovered from the reaction mixture either by evaporation of the solvent or by diluting the mixture with a suitable nonsolvent for the product, for example chloroform, to cause the product to precipitate out. Separation from the mother liquor can then be effected by known means, such as filtration, decantation or centrifugation. Should the reaction be conducted in water, the monohydroxamic acid product can be recovered by evaporation of the water under reduced pressure. Purification of the crude monohydroxamic acid product can be accomplished, for instance, by washing the product with a stable organic solvent in which either the hydroxylamine or the lactone, or both, are soluble but in which the acid is substantially insoluble. Suitable such solvents include, for example, diethyl ether. Also, the crude acid may be purified by recrystallization from a suitable solvent, for example from acetone-water mixtures.

According to the present invention, the hydroxyl-containing hydroxamic acids resulting from the reaction between the lactone and hydroxylamine can be converted, via reaction with phosgene, to cyclic nitrile carbonate group-containing chloroformates according to the general equation:

(2) 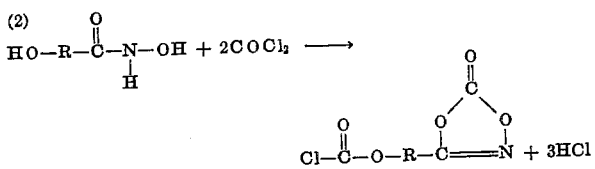

wherein R is an aliphatic hydrocarbon radical of 2 to 11 carbon atoms corresponding to the above descriptions. Thus it is seen that phosgenation of the hydroxyl group-containing hydroxamic acid with a double molar amount of phosgene results in the conversion of the acid's hydroxyl group to a chlorocarbonyloxy group and the conversion of the acid's hydroxamic acid moiety to a cyclic nitrile carbonate moiety. Thus, where the hydroxamic acid employed is, for example, 2-hydroxyethane-1-hydroxamic acid the reaction with phosgene proceeds to yield 2(chlorocarbonyloxy)ethane-1-nitrile carbonate:

(3) 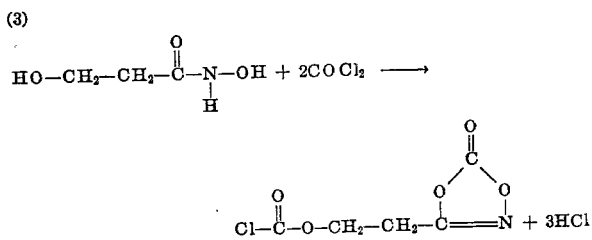

Because the hydroxamic acid starting material is characterized by its carbon-bonded hydroxyl group being separated from its carbonyl carbon atom by at least 2 carbon atoms, the chloroformate obtained therefrom will, in turn, be characterized by its nonring oxygen atom being separated from its nitrile carbon atom by at least 2 carbon atoms. In other words, the nonring oxygen atom of the chloroformate will be attached to a carbon atom which is separated from the cyclic nitrile carbonate group by a least one intervening carbon atom, as is the case with 2(chlorocarbonyloxy)ethane-1nitrile carbonate, shown above. The chloroformates are useful as blowing agents for vinyl resins and the like; when heated to decomposition temperatures they release carbon dioxide and are converted to the corresponding monochlorohydrocarbon-mono(nitrile carbonates) according to the general equation:

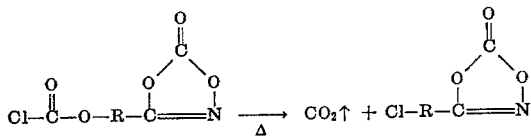

wherein R is as defined above.

The reaction of the monohydroxamic acid with the phosgene is effected by contacting the reactants with one another at a temperature above about −10° C. but below that at which the desired chloroformate product decomposes, for example below about 35° C. Often preferred are temperatures in the range of about +10° to +25° C. Advantageously, the reaction is conducted in the presence of a suitable, stable solvent which is a solvent for either the acid, the phosgene, or the chloroformate product, or any combination of the foregoing. Suitable such solvents include, for example, tetrahdrofuran, ethers (especially aliphatic, including cycloaliphatic, ethers such as diethylether and dioxane), chlorinated hydrocarbons (for example, chloroform), and mixtures of the foregoing. Preferably, a solvent system is employed in which both reactants are soluble. The amount of phosgene employed is preferably at least stoichiometric—that is, at least twice molar to the amount of hydroxamic acid. Often from 2 to about 2.5 moles of phosgene will be employed per mole of the acid.

To bring the hydroxamic acid and the phosgene into contact with one another in a solvent system, various techniques can be employed. Thus, for example, the phosgene can be added directly to a solution or suspension of the acid in a suitable solvent while keeping the temperature of the reaction mixture low enough to minimize side reactions involving the chloroformate product being formed. Also, if desired, the phosgene can first be dissolved in a separate solvent or in the same solvent as the acid before adding it to the solution or suspension of the acid. Alternatively, a solution or suspension of the acid can be added to a solution of the phosgene, for example in chloroform, or, if desired, the hydroxamic acid can be added directly to the phosgene solution, with the same attention being paid to control of the reaction mixture temperature as discussed above. The recovery of the chloroformate product from the reaction mixture can be by known methods, such as by the evaporation of volatiles (including unconverted starting materials), by solvent extraction with a selective solvent, etc.

According to the present invention, certain of those cyclic nitrile carbonate group-containing chloroformates obtained from the above discussed reaction between the hydroxamic acid and phosgene can be partially decomposed to yield ethylenically unsaturated cyclic nitrile carbonate compounds. The chloroformates which can be so decomposed are those wherein the chlorocarbonyloxy group is separated from the cyclic nitrile carbonate group by a paraffinic carbon-to-carbon chain of 2 carbon atoms, i.e., the two groups are separated by the radical:

The 2 carbon atom chain can be unsubstituted (in which case the chloroformate is 2(chlorocarbonyloxy)ethane-1-nitrile carbonate) carbonate) or it can be partially substituted, e.g. with alkyl groups such as methyl and ethyl, so long as that carbon atom thereof which is adjacent to the cyclic nitrile carbonate group has bonded to itself at least one hydrogen atom. In other words, the alpha carbon atom (with respect to the cyclic nitrile carbonate group) must be either a secondary or a tertiary carbon atom; preferably, the beta carbon atom also has bonded to itself at least one hydrogen atom. Suitable chloroformate starting materials include, for example, 2(chlorocarbonyloxy)1-nitrile carbonate, 2(chlorocarbonyloxy)propane-1-nitrile carbonate, and 1(chlorocarbonyloxy)propane-2-nitrile carbonate.

To prepare such chloroformates by the aforedescribed process of the present invention requires that the hydroxamic acid which is phosgenated as discussed above contain the same paraffinic carbon-to-carbon chain of 2 carbon atoms separating the hydroxyl group from the hydroxamic acid group. To prepare such an acid by the process of the present invention in turn requires that the lactone starting material contain the same paraffinic carbon-to-carbon chain of 2 carbon atoms joining the ring oxygen to the ring carbonyl carbon atom; in other words, the lactone must contain a total of 3 ring carbon atoms and the carbon atom which is adjacent to the ring carbonyl carbon atom must be bonded to at least one hydrogen atom.

The partial decomposition of the cyclic nitrile carbonate group-containing chloroformate to yield the ethylenically unsaturated cyclic nitrile carbonate compound involves decarboxylation and dehydrochlorination of the chloroformate starting material with a resultant double bond formation between the 2 carbon atoms separating the chlorocarbonyloxy group from the cyclic nitrile carbonate group. Thus, where the chloroformate employed is, for example, 2(chlorocarbonyloxy)ethane-1-nitrile carbonate the partial decomposition proceeds to yield ethene nitrile carbonate:

(4)

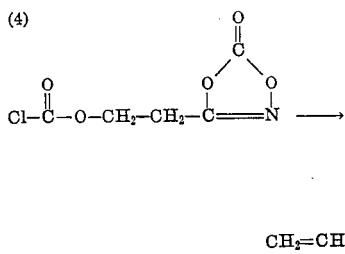

CH$_2$=CH—C$\overset{O}{\underset{O}{\diagup \diagdown}}$N + CO$_2$ + HCl

The decarboxylation and dehydrochlorination of the above chloroformates is effected by contacting the chloroformate with an organic tertiary amine of 3 to about 18 or more carbon atoms, e.g. a tertiary aliphatic amine (including cyclic as well as acyclic tertiary amines, and poly-, e.g. di-, tertiary amines as well as mono-tertiary amines). The tertiary amine should have a pK value below about 5, say in the range of about 3 to 4. As suitable such tertiary amines may be mentioned, for example, the trialkylmonoamines wherein each alkyl group has from 1 to about 4 carbon atoms. Especially preferred are the tri(lower alkyl) monoamines, e.g., trimethylamine, triethyl amine, and triisobutyl amine. Also suitable are the cyclic tertiary amines, for instance those wherein the ring is composed of one or more alkylene groups and one or more tertiary amino nitrogen atoms, such as in the N,N'-dialkylpiperazines.

The contacting of the tertiary amine with the chloroformate results in a strongly exothermic reaction involving the release of carbon dioxide and HCl. The temperature of the reaction should be maintained below the temperature at which the desired ethylenically unsaturated cyclic nitrile carbonate product decomposes e.g. to an isocyanate) to a significant extent, or addition polymerizes through its ethylenic bond to a significant extent. Temperatures up to about 40° C., e.g. about 20 to 40° C., are often preferred. Control of the reaction temperature can be achieved, for example, through gradual addition of the tertiary amine to the chloroformate (preferably in solution in a stable solvent), or by contacting the reaction mixture with a cooling medium, or both.

The HCl released during the reaction is combined with the tertiary amine to form the amine hydrochloride. As indicated above, the decarboxylation-dehydrochlorination of the chloroformate is preferrably effected by gradually adding the tertiary amine to the chloroformate starting material. The rate of addition of the amine should be sufficiently slow that no substantial excess of uncombined amine is present in the reaction mixture, as such might serve to catalyze an addition polymerization reaction of the ethylenically unsaturated product. The total amount of tertiary amine which can be employed is stoichiometric, or preferably slightly less than stoichiometric, to the chloroformate. The use of excess amine complicates attempts to recover the product by distillation and also may cause undesired side reactions with the cyclic nitrile carbonate group and destruction of the desired product.

The decarboxylation-dehydrochlorination reaction is preferably conducted in the presence of a stable solvent, most preferably one in which the reactant and product are soluble. Suitable solvents include those same solvents as are disclosed above as being suitable for the proceeding reaction between the hydroxamic acid and phosgene, e.g. diethyl ether and chloroform. There can also be included in the reaction mixture, if desired, minor amounts of an addition polymerization inhibitor such as p-methoxyphenol to insure against polymerization of the ethylenically unsaturated cyclic nitrile carbonate product. The recovery of the ethylenically unsaturated cyclic nitrile carbonate product from the reaction mixture can be by known methods, such as by evaporation of volatiles, fractional distillation, solvent extraction, etc.

The invention will be further illustrated by reference to the following examples.

EXAMPLE I

Preparation of 2-Hydroxethane-1-Hydroxamic Acid

To a 3-liter, 3-necked, fluted, round bottom flask equipped with stirrer, dropping funnel, condenser, and thermometer, and containing 800 ml. of methanol and 208.5 g. (3 moles) of hydroxylamine hydrochloride, were added 303 g. (3 moles) of triethylamine dropwise at room temperature. The slurry was stirred constantly. After the addition was completed the temperature was taken down to 0° C. and maintained there while 216 g. (3 moles) of 3-hydroxypropanoic acid lactone was added dropwise. The reaction mixture was then allowed to equilibrate to room temperature and 2-hydroxyethane-1-hydroxamic acid was precipitated out by adding 2,400 ml. of chloroform. After standing in the refrigerator for some hours, the crystalline product was filtered out, dried at reduced pressure, and 241 g. (77 percent yield of 2-hydroxyethane-1-hydroxamic acid, identified by infrared analysis, elemental analysis and chemical reactivity, was recovered.

EXAMPLE II

Preparation of 2-Hydroxyethane-1-Hydroxamic Acid

An aqueous solution of hydroxylamine was first prepared by adding dropwise, over a 1 hour period, a solution of 328.3 g. (2 moles) of (NH$_3$OH)$_2$SO$_4$ in one liter of water to a rapidly stirred slurry of 631 g. (2 moles) of Ba(OH)$_2$. 8H$_2$0 in 750 ml. of water. After 30 minutes of additional stirring, the mixture was filtered.

To a stirred portion of the resulting filtrate was added dropwise 175 g. (2.43 moles) of 3-hydroxypropanoic acid lactone over a period of 1 hour. The pH dropped from 7.85 to 6.0 during the addition. Thirty-six minutes after the completion of the addition the pH had steadied at 5.5. The temperature during the addition was in the range of −3° to +2° C. The resulting solution was concentrated at reduced pressure to an oily liquid which crystallized to a rocklike, white solid which was obtained in the amount of 244 g. (representing a 94 percent yield). The crude solid had a melting point of 90°–93° C. A sample thereof was recrystallized from an acetone-water mixture. The recrystallized material had a melting point of 107°–108° C. and gave an intense purple color with FeCl$_3$ solution (a positive hydroxamic acid test). Infrared analysis of a sample of the recrystallized material in "Nujol" mull indicated a broad absorption for the two hydroxyl groups at about 3 microns and a correct carbonyl absorption at 6.1 microns. Elemental analysis of the product indicated 34.45 weight percent carbon, 6.77 weight percent hydrogen, and 13.1 weight percent nitrogen, as compared to a calculated value therefor of 34.4 weight percent carbon, 6.66 weight percent hydrogen, and 13.3 weight percent nitrogen.

EXAMPLE III

Preparation of 5-Hydroxpentane-1-Hydroxamic Acid

Hydroxylamine hydrochloride in the amount of 139 g. (2.0 moles) was dissolved in 800 ml. of methanol with slight heating and then cooled to 25° C. The solution was then added with rapid stirring to a solution of 80 g. (2.0 moles) of sodium hydroxide in 500 ml. of methanol at a temperature below 30° C. The mixture was then cooled to 0°–5° C. for 10 minutes and the precipitated sodium chloride filtered off. To the filtrate was added dropwise 228 g. (2.0 moles) of 6-hydroxyhexanoic acid lactone over a period of 1 hour and 47 minutes, and the resultant clear solution was stirred for another 2 hours and 15 minutes. The methanol was stipped under vacuum in a rotary evaporator at room temperature. The residue was extracted 3 times with 500 ml. of diethyl ether for one-half hour to remove unreacted lactone. There was obtained 241 g. (representing an 82 percent yield) of 5-hydroxypentane-1-hydroxamic acid.

EXAMPLE IV

Preparation of 5(Chlorocarbonyloxy)Pentane-1-Nitrile Carbonate

Twenty-nine and four-tenths (29.4) g. (0.2 mole) of 5-hydroxypentane-1-hydroxamic acid was added in one-half hour to a solution of 119 g. (1.2 moles) of phosgene in 100 ml. of ethanol-free, dried chloroform at 5° to 12° C. The resulting, sticky, white solid was dissolved by addition of 100 ml. of p-dioxane. Excess phosgene was decomposed with sodium bicarbonate and the resulting sodium chloride filtered off. After removal of the solvents under vacuum at room temperature, 46.5 g. (representing a 98.7 percent yield) of 5(chlorocarbonyloxy)pentante-1-nitrile carbonate, in the form of an oil, was obtained. The identity of the product was confirmed by nuclear magnetic resonance (NMR) and infrared analysis.

EXAMPLE V

Preparation of 2(Chlorocarbonyloxy)ethane-1-Nitrile Carbonate

A solution of 62 g. of 2-hydroxyethane-1-hydroxamic acid in 200 ml. of tetrahydrofuran (THF) was added in one portion to a stirred solution of 205 g. of phosgene in 300 ml. of THF at room temperature. A vigorous reaction occurred causing a 15° C. exotherm as the mixture become homogeneous. After additional stirring (15 min.), THF was stripped, leaving 114.4 g. (representing 100 percent yield) of a fluid oil. An infrared spectrum of the oil showed absorption peaks at 5.35 and 5.45 microns, characteristic of the nitrile carbonate group, and a band at 565 microns, characteristic of chloroformate esters, thus confirming the identification of the product as 2(chlorocarbonyloxy)ethane-1-nitrile carbonate.

EXAMPLE VI

Preparation of Ethene Nitrile Carbonate

Triethylamine (36.3 g. 0.358 mole) in 200 ml. of diethyl ether was added dropwise during 45 minutes to a stirred solution of 75.8 g. of the product of example V in 200 ml. of diethyl ether at 26° C. After 20–30 ml. of the amine solution were added, a second, oily phase separated. The exothermic reaction raised the temperature to reflux at 32° C., where it remained as the rate of amine addition was adjusted. The mixture was stirred for 21 hours and then filtered. There was obtained in the filter cake 52 g. of triethylamine hydrochloride. The filtrate was evaporated to an oil. Fractional distillation of the oil yielded a clear, colorless liquid having a boiling point of 40°—47° C. at 4.7 mm. of mercury pressure. The yield thereof was 74 percent of theoretical.

NMR analysis of the product revealed only unsaturated protons, apparently of the acrylic variety. Infrared analysis indicated that the chloroformate group had disappeared, leaving the nitrile carbonate group still intact. Mass spectrometric determination of the molecular weight gave a value of 113, the molecular weight of ethane nitrile carbonate. The identity of the product was further confirmed by the following elemental analysis.

Calculated for $C_4H_3NO_3$: C, 42.4 percent; H, 3.66 percent; N, 12.4 percent

Found: C, 42.85 percent, H, 3.11 percent, N, 11.43 percent.

EXAMPLE VII A Preparation of Ethene Nitrile Carbonate

A 2-liter, fluted, round bottom flask equipped with stirrer, condenser, dropping funnel and thermometer, and containing 233 g. (1.2 moles) of 2(chlorocarbonyloxy)ethane-1-nitrile carbonate and 2.33 g. of P-methoxyphenol as an inhibitor, was treated with 109.7 g. (1.08 moles) of triethylamine. The addition was carried out dropwise and at room temperature. The reaction mixture was then allowed to stand for several hours and was then washed with ice water (3 times), dried over magnesium sulfate and distilled at reduced pressure to yield a liquid product having a boiling point of 51° C. at 4 mm. Hg pressure. The product, 85 g. of which were obtained, representing a 69 percent yield, was identified by the characteristic I.R. absorption of 5.35 5.45 and 9.65 microns and by elemental analysis.

It is claimed:

1. A process for preparing ethylenically unsaturated cyclic nitrile carbonate compounds which comprises decomposing a cyclic nitrile carbonate group-containing chloroformate of the general formula:

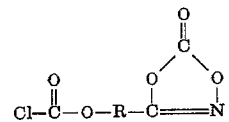

wherein R is saturated aliphatic hydrocarbon of 2 to 11 carbon atoms, 2 carbon atoms of which separate the nonring oxygen atom from the nitrile carbon atom, the carbon atom of which is bonded to the nitrile carbon atom also being bonded to at least one hydrogen atom, said decomposing being to the extent of effecting decarboxylation and dehydrochlorination of the chloroformate and formation of a double bond between the 2 carbon atoms which separate the nonring oxygen atom of the chloroformate from the nitrile carbon atom thereof, said decomposing being effected by contacting the chloroformate at a temperature below the temperature at which the desired ethylenically unsaturated product decomposes and below the temperature at which said product addition polymerizes through its ethylenic bond, with an organic, tertiary amine having a pK value below about 5.

2. The process of claim 1 wherein the carbon atom of the chloroformate which is bonded to the nitrile carbon atom is also bonded to 2 hydrogen atoms.

3. The process of claim 1 wherein the carbon atom of the chloroformate which is bonded to the nonring oxygen atom and which separates the latter from the nitrile carbon atom is also bonded to at least 1 hydrogen atom.

4. The process of claim 2 wherein the carbon atom of the chloroformate which is bonded to the nonring oxygen atom and which separates the latter from the nitrile carbon atom is also bonded to at least 1 hydrogen atom.

5. The process of claim 1 wherein the chloroformate is 2 (chlorocarbonyloxy)ethane-1-nitrile carbonate and the resultant ethylenically unsaturated cyclic nitrile carbonate compound is ethene nitrile carbonate.

6. The process of claim 1 wherein the amine is a tertiary aliphatic amine and the contacting is conducted at a temperature of about 20° to 40° C.

7. The process of claim 5 wherein the amine is a tertiary aliphatic amine and contacting is conducted at a temperature of about 20° to 40° C.

8. The process of claim 1 wherein the amine is triethylamine and the contacting is conducted at a temperature of about 20° to 40° C.

9. The process of claim 5 wherein the amine is triethylamine and the contacting is conducted at a temperature of about 20° to 40° C.

10. A process for preparing ethylenically unsaturated cyclic nitrile carbonate compounds which comprises A. contacting a lactone which is a cyclic anhydride of a monohydroxyl-substituted, saturated, aliphatic hydrocarbon monocarboxylic acid of 3 to 12 carbons, the ring of said lactone containing 4 members and the ring carbon atom which is bonded to ten ring carbonyl carbon atom also being bonded to at least one hydrogen atom, with at least an equimolar amount of hydroxylamine at a temperature of about −10° to +70° C. to produce the N-hydroxyamide of the acid;

B. phosgenating the resultant N-hydroxyamide to convert the carbon-bonded hydroxyl group thereof to a chlorocarbonyloxy group and to convert the hydroxamic acid group of the amide to a cyclic nitrile carbonate group, said phosgenating being conducted with at least a stoichiometric amount of phosgene and at a temperature above about −10° C. but below the decomposition point of the desired cyclic nitrile carbonate group-containing chloroformate; and C. decomposing the resultant chloroformate to the extent of effecting decarboxylation and dehydrochlorination of the same and formation of a double bond between the 2 carbon atoms which separate the nonring oxygen atom of the chloroformate from the nitrile carbon atom thereof, said decomposing being effected by contacting the chloroformate, at a temperature below the temperature at which the desired ethylenically unsaturated product decomposes and below the temperature at which said product addition polymerizes through its ethylenic bond, with an organic, tertiary amine having a pK value below about 5.

11. The process of claim 10 wherein, as regards the lactone in step A, the ring carbon atom which is bonded to the ring carbonyl carbon atom is also bonded to 2 hydrogen atoms.

12. The process of claim 10 wherein, as regards the lactone in step A, the ring carbon atom which is beta to the ring carbonyl carbon atom and which is bonded to the ring oxygen atom is also bonded to at least 1 hydrogen atom.

13. The process of claim 10 wherein, as regards the lactone in step A, the ring carbon atom which is beta to the ring carbonyl carbon atom and which is bonded to the ring oxygen atom is also bonded to at least 1 hydrogen atom.

14. The process of claim 10 wherein the contacting of step A is conducted at a temperature of about −5° to +30° C. while the hydroxylamine is in solution in a stable solvent; and further wherein the amine of step (C) is triethylamine and the contacting thereof is conducted at a temperature of about 20° to 40° C.

15. The process of claim 14 wherein the lactone of step A is 3-hydroxypropanoic acid lactone and the ethylenically unsaturated cyclic nitrile carbonate compound of step C is ethene nitrile carbonate.